US012732121B2

(12) United States Patent
Ravindranath et al.

(10) Patent No.: US 12,732,121 B2
(45) Date of Patent: Sep. 8, 2026

(54) PREDICTIVE VOLTAGE BOOST FOR ACTIVE ELECTRIC MOTOR DAMPING

(71) Applicant: FCA US LLC., Auburn Hills, MI (US)

(72) Inventors: Shraavan Ravindranath, Sterling Heights, MI (US); Eric J Blash, Shelby Township, MI (US)

(73) Assignee: FCA US LLC, Auburn Hills, MI (US)

( * ) Notice: Subject to any disclaimer, the term of this patent is extended or adjusted under 35 U.S.C. 154(b) by 157 days.

(21) Appl. No.: 18/426,420

(22) Filed: Jan. 30, 2024

(65) Prior Publication Data

US 2025/0247026 A1 Jul. 31, 2025

(51) Int. Cl.
*H02P 5/68* (2006.01)
*B60L 15/20* (2006.01)

(52) U.S. Cl.
CPC ................ *H02P 5/68* (2013.01); *B60L 15/20* (2013.01); *B60L 2210/14* (2013.01); *B60L 2240/12* (2013.01); *B60L 2240/423* (2013.01); *B60L 2240/427* (2013.01); *B60L 2240/547* (2013.01)

(58) Field of Classification Search
CPC .. H02P 5/68; H02P 21/05; H02P 23/04; B60L 15/20; B60L 2210/14; B60L 2240/12; B60L 2240/423; B60L 2240/427; B60L 2240/547; G05B 2219/41121
See application file for complete search history.

(56) References Cited

U.S. PATENT DOCUMENTS 7,292,917 B2 11/2007 Kuang et al.
10,994,721 B2 5/2021 Yamazaki et al.
11,268,582 B2 3/2022 Ravichandran et al.

FOREIGN PATENT DOCUMENTS

JP 2006136184 A * 5/2006 ............ H02P 25/098
JP 2009196533 A * 9/2009
WO WO-2007142165 A1 * 12/2007 ............ B60W 10/08

* cited by examiner

*Primary Examiner* — Bickey Dhakal
(74) *Attorney, Agent, or Firm* — Jeremy J. Klobucar

(57) ABSTRACT

An active electric motor damping (AEMD) control system for an electrified powertrain of a vehicle involves dynamically determining, based on a set of operating parameters of an electric motor, an AEMD torque boost voltage margin for a direct current to direct current (DC-DC) boost converter of the electrified powertrain, wherein the AEMD torque boost voltage margin is an additional voltage for increasing a torque capability of the electric motor, outputting, to the DC-DC boost converter, the AEMD torque boost voltage margin, wherein receipt of the AEMD torque boost voltage margin causes the DC-DC boost converter to boost a first voltage from a battery system of the electrified powertrain to a higher second voltage, and controlling the electric motor using the higher second voltage to dampen vibrations at a driveline of the vehicle.

16 Claims, 4 Drawing Sheets

PREDICTIVE VOLTAGE BOOST FOR ACTIVE ELECTRIC MOTOR DAMPING

FIELD

The present application generally relates to electrified vehicles and, more particularly, to techniques for predictive voltage boost for active electric motor damping (AEMD).

BACKGROUND

An electrified vehicle includes at least one electric motor configured to generate torque that is provided to a driveline for vehicle propulsion. During transient maneuvers, such as accelerator pedal tip-in, motor drive torque changes suddenly and can cause undesirable driveline vibrations. To compensate for this, active electric motor damping (AEMD) utilizes a torque modifier where the torque applied to the electric motor is damped to reduce or mitigate the driveline vibrations. Some electrified powertrains include a direct current to direct current (DC-DC) boost converter that to boosts or steps-up voltage from a battery system to improve the electric motor capabilities with a lower voltage battery system. At higher boost voltages, the electric motor(s) have higher torque/power capacities (albeit with lower efficiencies). There is a time delay, however, for the DC-DC boost converter to build this boost voltage. Accordingly, while such conventional electric motor and AEMD control systems do work well for their intended purpose, there exists an opportunity for improvement in the relevant art.

SUMMARY

According to one example aspect of the invention, an active electric motor damping (AEMD) control system for an electrified powertrain of a vehicle is presented. In one exemplary implementation, the AEMD control system comprises a set of sensors configured to measure a set of operating parameters of the vehicle and a control system configured to receive the set of operating parameters of the vehicle, dynamically determine, based on the set of operating parameters of the vehicle, an AEMD torque boost voltage margin for a direct current to direct current (DC-DC) boost converter of the electrified powertrain, wherein the AEMD torque boost voltage margin is an additional voltage for increasing a torque capability of an electric moto of the electrified powertrain, output, to the DC-DC boost converter, the AEMD torque boost voltage margin, wherein receipt of the AEMD torque boost voltage margin causes the DC-DC boost converter to boost a first voltage from a battery system of the electrified powertrain to a higher second voltage, and control the electric motor using the higher second voltage to dampen vibrations at a driveline of the vehicle.

In some implementations, the set of operating parameters of the vehicle includes (i) a current torque of the electric motor and (ii) a current speed of the vehicle. In some implementations, the control system is configured to dynamically determine the AEMD torque boost voltage margin using a calibrated two-dimensional surface based on the current torque of the electric motor and the current speed of the vehicle. In some implementations, the electric motor is a first electric motor and the electrified powertrain further comprises a second electric motor. In some implementations, the set of operating parameters further includes a current speed of the first electric motor, a current torque of the second electric motor, a current speed of the second electric motor, and the first voltage of the battery system.

In some implementations, the DC-DC boost converter is configured to boost the first voltage to the higher second voltage based on the set of operating parameters and the AEMD torque boost voltage margin. In some implementations, the control system is further configured to predict the AMED torque boost voltage margin based further on (i) a maximum torque of the electric motor at its current speed and a current boost voltage from the DC-DC converter, (ii) a current torque request for the electric motor, and (iii) a safety margin. In some implementations, the control system is not configured to determine or utilize a constant voltage margin. In some implementations, the dynamic determination of the AEMD torque boost voltage margin mitigates or eliminates an inefficiency that would result from utilizing the constant voltage margin.

According to another example aspect of the invention, an AEMD control method for an electrified powertrain of a vehicle is presented. In one exemplary implementation, the AEMD control method comprises receiving, by a control system and from a set of sensors, a set of operating parameters of the vehicle, dynamically determining, by the control system and based on the set of operating parameters of the vehicle, an AEMD torque boost voltage margin for a DC-DC boost converter of the electrified powertrain, wherein the AEMD torque boost voltage margin is an additional voltage for increasing a torque capability of an electric motor of the electrified powertrain, outputting, by the control system and to the DC-DC boost converter, the AEMD torque boost voltage margin, wherein receipt of the AEMD torque boost voltage margin causes the DC-DC boost converter to boost a first voltage from a battery system of the electrified powertrain to a higher second voltage, and controlling, by the control system, the electric motor using the higher second voltage to dampen vibrations at a driveline of the vehicle.

In some implementations, the set of operating parameters of the vehicle includes (i) a current torque of the electric motor and (ii) a current speed of the vehicle. In some implementations, the dynamically determining of the AEMD torque boost voltage margin is performed using a calibrated two-dimensional surface based on the current torque of the electric motor and the current speed of the vehicle. In some implementations, the electric motor is a first electric motor and the electrified powertrain further comprises a second electric motor. In some implementations, the set of operating parameters further includes a current speed of the first electric motor, a current torque of the second electric motor, a current speed of the second electric motor, and the first voltage of the battery system.

In some implementations, the DC-DC boost converter boosts boost the first voltage to the higher second voltage based on the set of operating parameters and the AEMD torque boost voltage margin. In some implementations, the method further comprises predicting, by the control system, the AMED torque boost voltage margin based further on (i) a maximum torque of the electric motor at its current speed and a current boost voltage from the DC-DC converter, (ii) a current torque request for the electric motor, and (iii) a safety margin. In some implementations, the control system is not configured to determine or utilize a constant voltage margin. In some implementations, the dynamic determination of the AEMD torque boost voltage margin mitigates or eliminates an inefficiency that would result from utilizing the constant voltage margin.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, during transient maneuvers, such as accelerator pedal tip-in, motor drive torque changes suddenly and can cause undesirable driveline vibrations. To compensate for this, active electric motor damping (AEMD) utilizes a torque modifier where the torque applied to the electric motor is damped to reduce or mitigate the driveline vibrations. Some electrified powertrains include a direct current to direct current (DC-DC) boost converter that to boosts or steps-up voltage from a battery system to improve the electric motor capabilities with a lower voltage battery system. At higher boost voltages, the electric motor(s) have higher torque/power capacities (albeit with lower efficiencies). There is a time delay, however, for the DC-DC boost converter to build this boost voltage. One conventional is to carry or include a constant AEMD torque margin in the torque command request to the boost voltage controller. Such a static voltage margin does allow for immediate application of AEMD torque (up to the constant limit). However, during scenarios or periods where AEMD torque is not required, it runs the motor(s) at higher than the necessary boost voltage. At higher boost voltages, the electric motor(s) run less efficiently and thereby causes a reduction in the fuel economy/range.

Accordingly, improved AEMD control systems and methods are presented herein. These techniques dynamically predict or determine and then change the boost voltage required to meet a predicted AEMD torque requirement. This parameter or metric is referred to herein as an AEMD torque boost voltage margin, which represents a voltage margin (i.e., an additional voltage) that could then be utilized for AEMD control. A supervisory controller, such as an electrified vehicle control unit (EVCU), requests this additional torque margin from a boost voltage controller. The techniques use current boost voltage, motor torque, motor speed, and vehicle speed to predict the voltage boost margin and the AEMD torque requirement. This could involve the use of a multi-dimensional (e.g., two-dimensional) calibrated surface. In some implementations, the electrified powertrain includes two or more electric motors, but the AEMD is only performed using one of the electric motors. By providing AEMD torque only when necessary, system efficiency is improved compared to the conventional solution described above, while also improving drivability via reduced drivetrain vibrations as desired.

Figure 1:
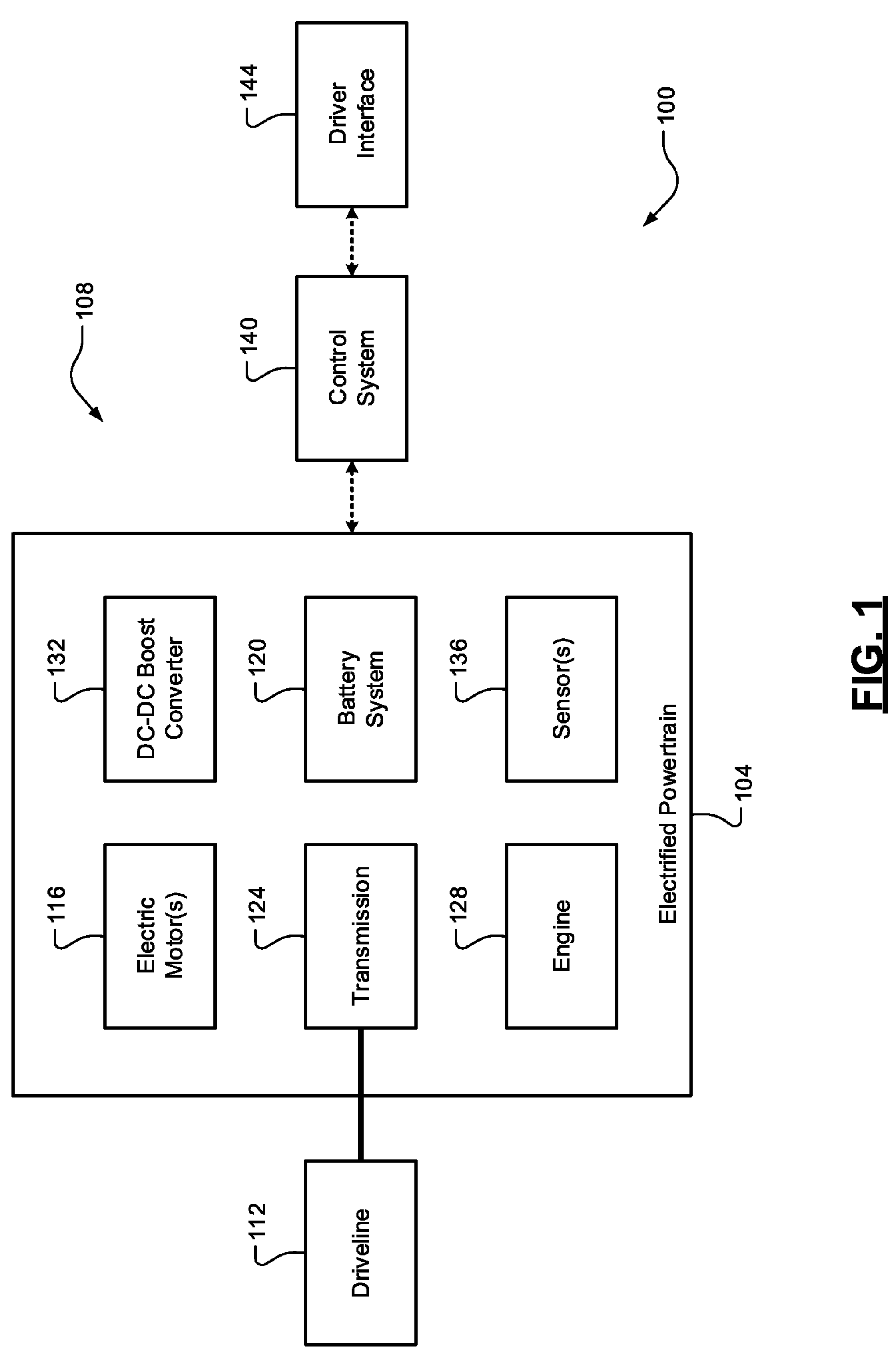
FIG. 1 is a functional block diagram of a vehicle having an electrified powertrain and an active electric motor damping (AEMD) system according to the principles of the present application.

Referring now to FIG. 1, a functional block diagram of a vehicle 100 having an electrified powertrain 104 and an active electric motor damping (AEMD) system 108 according to the principles of the present application is illustrated. The electrified powertrain 104 is configured to generate and transfer torque to a driveline 112 for vehicle propulsion. The electrified powertrain 104 generally comprises one or more electric motors 116 powered by a battery system 120 (e.g., a high voltage battery pack). The electric motor(s) 116 are configured to generate torque that is transferred to the driveline via a transmission 124, such as a multi-speed automatic transmission. In some implementations, the electrified powertrain 104 could also include an internal combustion engine 128 configured either for propulsion or for electrical energy generation and recharging of the battery system 120. In one exemplary implementation, the electrified powertrain 104 includes two electric motors (e.g., motor A 116*a* and motor B 116*b*) configured in any suitable configuration (e.g., one electric motor per driveline axle).

The electrified powertrain 104 also includes a DC-DC boost converter 132 that is configured to step-up or boost a first voltage of the battery system 120 to a higher second voltage. This additional voltage could be used, for example, as part of the AEMD control techniques of the present application. The electrified powertrain 104 also includes a set of one or more sensors 136 configured to measure various operating parameters of the vehicle 100. Non-limiting examples of these operating parameters include motor speed, motor torque, vehicle speed, and battery system voltage. While shown as part of the electrified powertrain 104, it will be appreciated that the sensor(s) 136 could be external to the electrified powertrain 104. A control system 140 comprising one or more controllers or electronic control units (ECUs) is configured to control operation of the vehicle 100. This primarily includes controlling the electrified powertrain 104 to generate an amount of drive torque to satisfy a torque request received from a driver via a driver interface 144 (e.g., an accelerator pedal). The control system 140 is also configured to perform at least a portion of the AEMD control techniques of the present application, which will now be discussed in greater detail.

Figure 2A:
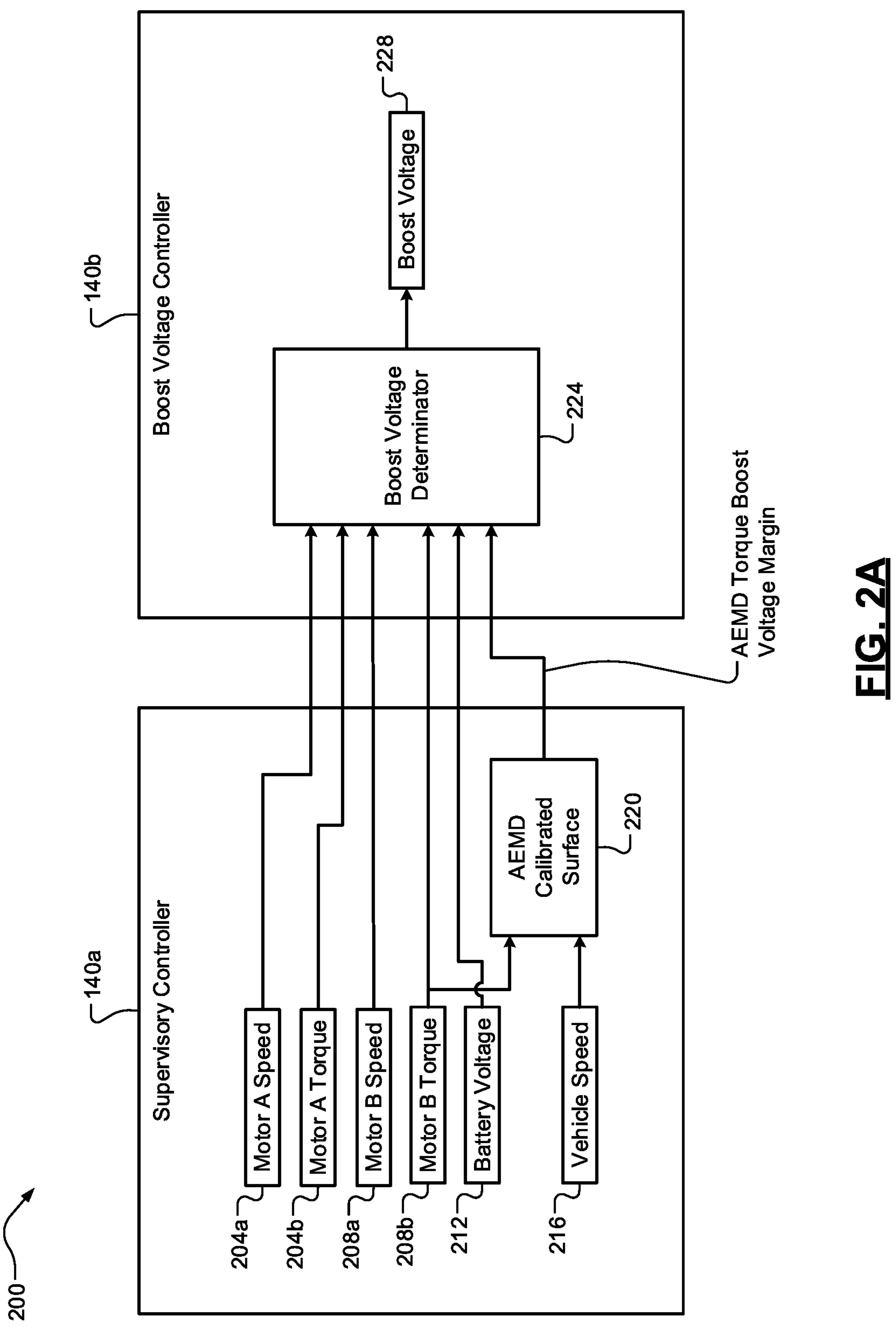
FIGS. 2A-2B are functional block diagrams of two different example architectures for the AEMD system according to the principles of the present application.
Figure 2B:
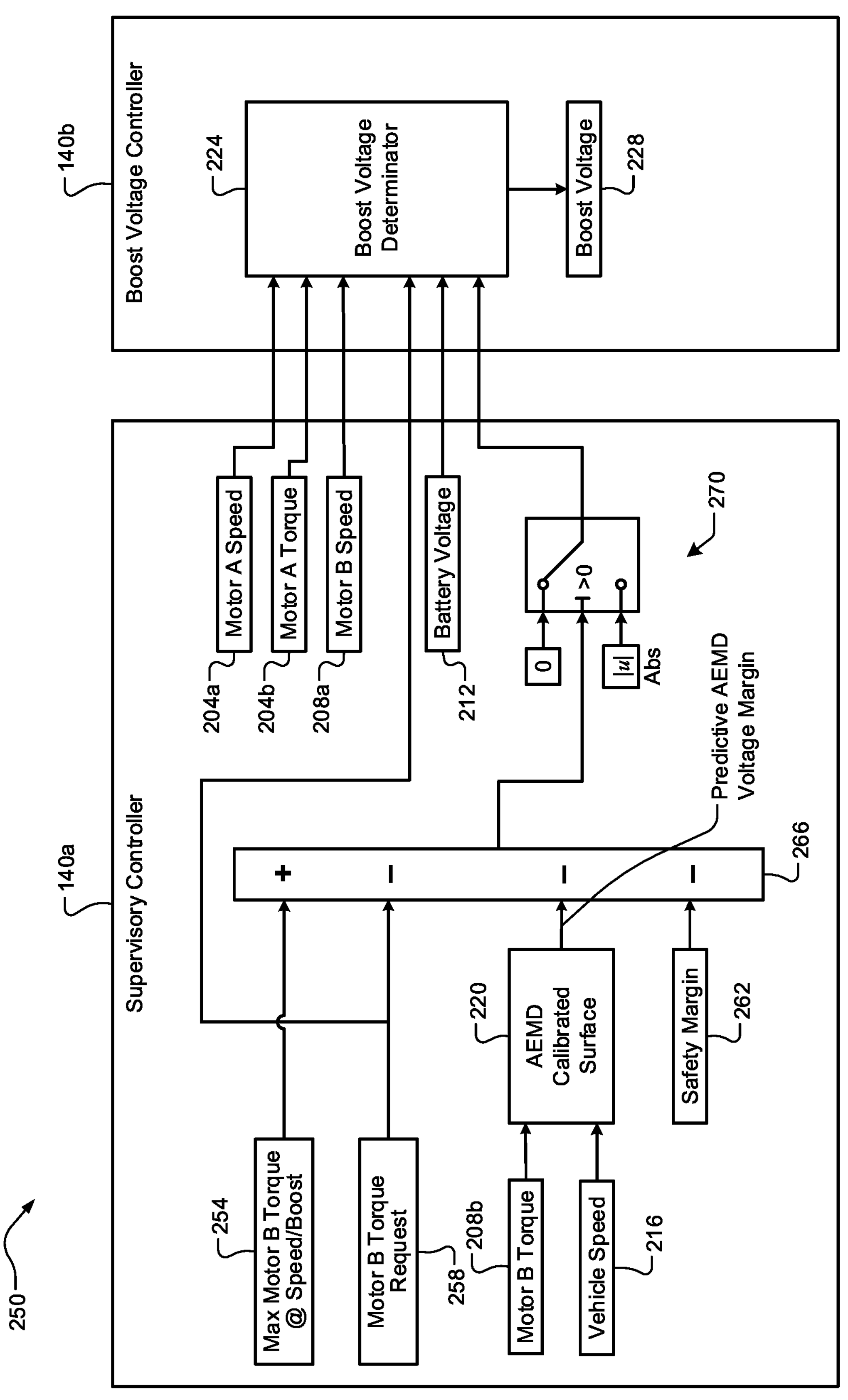

Referring now to FIGS. 2A-2B, functional block diagrams of two different example architectures 200, 250 for the AEMD system 108 according to the principles of the present application are illustrated. In FIG. 2A, the first example architecture 200 of the control system 140 (hereinafter, "control system 200") is illustrated. The control system 200 includes a supervisory controller 140*a* (an EVCU, a hybrid control processor or HCP, etc.) and a boost voltage controller 140*b* for the DC-DC boost converter 132. The supervisory controller 140*a* obtains a plurality of measured parameters such as motor A speed 204*a*, motor A torque 204*b*, motor B speed 208*a*, motor B torque 208*b*, battery system voltage 212, and vehicle speed 216. The battery voltage 212 and the vehicle speed 216 are fed or input to an AEMD calibrated surface 220 (e.g., a calibrated two-dimensional look-up table) that generates, based on these inputs, an AEMD torque boost voltage margin. This value represents an additional amount of voltage (i.e., above a voltage of the battery system 120) that is necessary for AEMD control. The above-described parameters 204*a*, 204*b*, 208*a*, 208*b*, and 212 and the AMED torque boost voltage margin are all fed or input to a boost voltage determinator 224 in the boost voltage controller 140*b*, which in turn generates and outputs a boosted (second) voltage 228 for use in the AEMD control.

In FIG. 2B, the second example architecture 250 of the control system 140 (hereinafter, "control system 250") is illustrated. Many aspects of the control system 250 are shared with the control system 200 of FIG. 2A as previously described above, but there are also a few key differences. In FIG. 2B, the supervisory controller 140*b* also obtains operating parameters including a maximum motor B torque 254 at its current speed and the current voltage boost (if any) and a motor B torque request 258. This second example architecture 250 is predictive (as opposed to reactive). More specifically, the AEMD calibrated surface 220 is configured to generate/output a predictive AEMD voltage margin based on the motor B torque 208*b* and the vehicle speed 216. Thereafter, the maximum motor B torque 254 is fed into a difference block 266 that subtracts therefrom the motor B torque request 258, the predictive AEMD voltage margin, and a safety margin 262 (e.g., ~3 Newton-meters, or Nm). The output of difference block 266 is fed into another block 270 that limits the value to be greater than or equal to zero (i.e., not a negative value). This limited value is then fed or input to the boost voltage determinator 224 along with the same parameters as FIG. 2A to generate and output the boosted (second) voltage 228.

While motor speed/torque and vehicle speed are example input parameters shown herein and described throughout, it will be appreciated that these are only one example of various sets of input parameters that could be utilized for determining the AEMD torque boost voltage. For example, accelerator pedal position, rate of change of the driver torque request, and/or operating parameters an engine stop/start system could additionally or alternatively be used as input parameters for determining the AEMD torque boost voltage.

Figure 3:
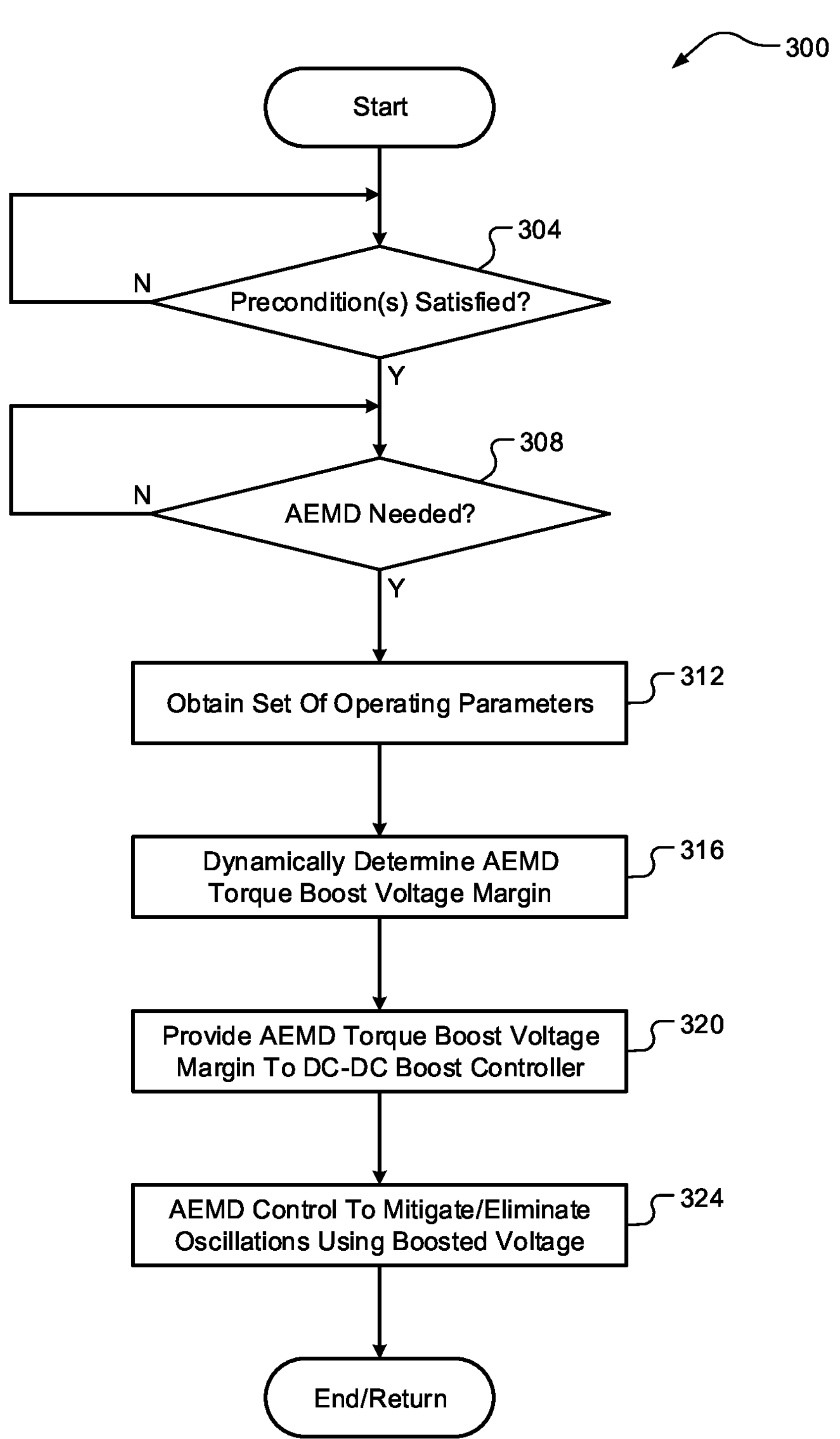
FIG. 3 is a flow diagram of an example AEMD control method for an electrified powertrain of a vehicle according to the principles of the present application.

Referring now to FIG. 3, a flow diagram of an example AEMD control method 300 for an electrified powertrain of a vehicle according to the principles of the present application is illustrated. While the method 300 specifically references the vehicle 100 and its components for illustrative/descriptive purposes, it will be appreciated that the method 300 could be applicable to any suitably configured electrified vehicle. The method 300 begins at 304. At 304, the control system 140 determines whether an optional set of one or more preconditions are satisfied. These precondition(s) could include, for example only, the electrified powertrain 104 being powered up and running and there being no malfunctions present that would otherwise inhibit or negatively impact the operation of the AEMD control techniques of the present application. When false, the method 300 ends or returns to 304. When true, the method 300 proceeds to 308.

At 308, the control system 140 determines whether AEMD is necessary. For example, in a reactive implementation, disturbances at the driveline 112 could be detected. Alternatively, for example, in a predictive implementation, transient operating conditions, such as accelerator pedal tip-in, could be detected. When false, the method 300 ends or returns to 304 or 308. When true, the method 300 proceeds to 312. At 312, the control system 140 obtains the set of operating parameters (e.g., using sensors 136) as previously described herein. At 316, the control system 140 dynamically determines the AEMD torque boost voltage margin based on the operating parameter(s). It will be appreciated that the phrase "dynamically determine" as used herein refers to continuously determining the AEMD torque boost voltage margin based on the changing/varying operating parameter(s). At 320, the control system 140 outputs or provides the AEMD torque boost voltage margin to the DC-DC boost converter 132 (or rather to its boost voltage controller 140*b*). At 324, the control system 140 uses the higher (boosted) second voltage to perform the AEMD control to thereby mitigate or eliminate the driveline disturbances/oscillations. The method 300 then ends or returns to 304 for one or more additional cycles.

It will be appreciated that the terms "control system" and "controller" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An active electric motor damping (AEMD) control system for an electrified powertrain of a vehicle, the AEMD control system comprising:

a set of sensors configured to measure a set of operating parameters of the vehicle; and a control system configured to:

receive the set of operating parameters of the vehicle;

dynamically determine, based on the set of operating parameters of the vehicle, an AEMD torque boost voltage margin for a direct current to direct current (DC-DC) boost converter of the electrified powertrain, wherein the AEMD torque boost voltage margin is an additional voltage for increasing a torque capability of an electric motor of the electrified powertrain, and wherein the AEMD torque boost voltage margin is not a constant voltage margin;

output, to the DC-DC boost converter, the AEMD torque boost voltage margin, wherein receipt of the AEMD torque boost voltage margin causes the DC-DC boost converter to boost a first voltage from a battery system of the electrified powertrain to a higher second voltage; and control the electric motor using the higher second voltage to dampen vibrations at a driveline of the vehicle.

2. The AEMD control system of claim 1, wherein the set of operating parameters of the vehicle includes (i) a current torque of the electric motor and (ii) a current speed of the vehicle.

3. The AEMD control system of claim 2, wherein the control system is configured to dynamically determine the AEMD torque boost voltage margin using a calibrated two-dimensional look-up table based on the current torque of the electric motor and the current speed of the vehicle.

4. The AEMD control system of claim 1, wherein the electric motor is a first electric motor and the electrified powertrain further comprises a second electric motor.

5. The AEMD control system of claim 4, wherein the set of operating parameters further includes a current speed of the first electric motor, a current torque of the second electric motor, a current speed of the second electric motor, and the first voltage of the battery system.

6. The AEMD control system of claim 5, wherein the DC-DC boost converter is configured to boost the first voltage to the higher second voltage based on the set of operating parameters and the AEMD torque boost voltage margin.

7. The AEMD control system of claim 1, wherein the control system is further configured to predict the AMED torque boost voltage margin based further on (i) a maximum torque of the electric motor at its current speed and a current boost voltage from the DC-DC converter, (ii) a current torque request for the electric motor, and (iii) a safety margin.

8. The AEMD control system of claim 1, wherein the dynamic determination and use of the AEMD torque boost voltage margin increases an efficiency of the DC-DC boost converter and the electric motor in dampening the vibrations at the driveline of the vehicle.

9. An active electric motor damping (AEMD) control method for an electrified powertrain of a vehicle, the AEMD control method comprising:

receiving, by a control system and from a set of sensors, a set of operating parameters of the vehicle;

dynamically determining, by the control system and based on the set of operating parameters of the vehicle, an AEMD torque boost voltage margin for a direct current to direct current (DC-DC) boost converter of the electrified powertrain, wherein the AEMD torque boost voltage margin is an additional voltage for increasing a torque capability of an electric motor of the electrified powertrain, and wherein the AEMD torque boost voltage margin is not a constant voltage margin;

outputting, by the control system and to the DC-DC boost converter, the AEMD torque boost voltage margin, wherein receipt of the AEMD torque boost voltage margin causes the DC-DC boost converter to boost a first voltage from a battery system of the electrified powertrain to a higher second voltage; and controlling, by the control system, the electric motor using the higher second voltage to dampen vibrations at a driveline of the vehicle.

10. The AEMD control method of claim 9, wherein the set of operating parameters of the vehicle includes (i) a current torque of the electric motor and (ii) a current speed of the vehicle.

11. The AEMD control method of claim 10, wherein the dynamically determining of the AEMD torque boost voltage margin is performed using a calibrated two-dimensional look-up table based on the current torque of the electric motor and the current speed of the vehicle.

12. The AEMD control method of claim 9, wherein the electric motor is a first electric motor and the electrified powertrain further comprises a second electric motor.

13. The AEMD control method of claim 12, wherein the set of operating parameters further includes a current speed of the first electric motor, a current torque of the second electric motor, a current speed of the second electric motor, and the first voltage of the battery system.

14. The AEMD control method of claim 13, wherein the DC-DC boost converter is configured to boost the first voltage to the higher second voltage based on the set of operating parameters and the AEMD torque boost voltage margin.

15. The AEMD control method of claim 9, further comprising predicting, by the control system, the AMED torque boost voltage margin based further on (i) a maximum torque of the electric motor at its current speed and a current boost voltage from the DC-DC converter, (ii) a current torque request for the electric motor, and a safety margin.

16. The AEMD control method of claim 9, wherein the dynamic determination and use of the AEMD torque boost voltage margin increases an efficiency of the DC-DC boost converter and the electric motor in dampening the vibrations at the driveline of the vehicle.

* * * * *